(12) United States Patent
Lundquist et al.

(10) Patent No.: US 7,903,698 B1
(45) Date of Patent: Mar. 8, 2011

(54) CONTROLLED OPTICAL FILAMENT GENERATION AND ENERGY PROPAGATION

(75) Inventors: Paul Lundquist, Tucson, AZ (US); Stephen William McCahon, Tucson, AZ (US)

(73) Assignee: Applied Energetics, Inc, Tucson, AZ (US)

( * ) Notice: Subject to any disclaimer, the term of this patent is extended or adjusted under 35 U.S.C. 154(b) by 1065 days.

(21) Appl. No.: 11/357,701

(22) Filed: Feb. 17, 2006

Related U.S. Application Data

(63) Continuation-in-part of application No. 10/640,304, filed on Aug. 14, 2003, now Pat. No. 7,050,469, and a continuation-in-part of application No. 10/640,336, filed on Aug. 14, 2003, now Pat. No. 7,277,460.

(51) Int. Cl.
*H01S 3/10* (2006.01)
(52) U.S. Cl. ............................................. 372/9; 372/109
(58) Field of Classification Search ............... 372/9, 109
See application file for complete search history.

(56) References Cited

U.S. PATENT DOCUMENTS

| | | | |
|---|---|---|---|
| 3,404,403 A | 10/1968 | Vallese | |
| 3,719,829 A | 3/1973 | Vaill | |
| 3,947,654 A | 3/1976 | Fairbairn | |
| 4,017,767 A | 4/1977 | Ball | |
| 4,453,196 A * | 6/1984 | Herr ............................. | 361/232 |
| 4,504,964 A | 3/1985 | Cartz et al. | |
| 5,175,664 A | 12/1992 | Diels et al. | |
| 5,473,501 A | 12/1995 | Claypool | |
| 5,675,103 A | 10/1997 | Herr | |
| 5,726,855 A | 3/1998 | Mourou et al. | |
| 5,930,313 A | 7/1999 | Slinker et al. | |
| 5,952,600 A | 9/1999 | Herr | |
| 6,046,705 A | 4/2000 | Anderson | |
| 6,087,992 A | 7/2000 | Anderson | |
| 6,087,993 A | 7/2000 | Anderson et al. | |
| 6,111,237 A | 8/2000 | Paustian | |
| 6,118,407 A | 9/2000 | Anderson | |
| 6,169,520 B1 | 1/2001 | Anderson | |
| 6,191,386 B1 | 2/2001 | Albright et al. | |
| 6,355,908 B1 | 3/2002 | Tatah et al. | |
| 6,359,687 B1 | 3/2002 | Cheng | |
| 6,369,763 B1 | 4/2002 | Norris et al. | |

(Continued)

OTHER PUBLICATIONS

B. La Fontaine, et al, "The influence of electron density on the formation of streamers in Electrical Discharges triggered with ultrashort laser pulses," IEEE Transactions on Plasma Science, vol. 27, No. 3, Jun. 1999.

(Continued)

*Primary Examiner* — Tod T Van Roy
(74) *Attorney, Agent, or Firm* — Duft Bornsen & Fishman LLP; Gregory T. Fettig

(57) ABSTRACT

Systems and methods herein provide for the controlled formation of plasma filaments. For example, a system that radiates energy through a gas includes a laser that generates a laser pulse, and an optical element with which the laser propagates the laser pulse to control placement of an optical filament within a beam cross-section of the laser pulse. The optical filament may thereby generate a plasma filament, which may propagate energy. In this regard, an energy source may provide energy such that the plasma filament directs propagation of the energy for delivery to an application. The energy may be electrical energy, electromagnetic energy, optical energy, or a combination thereof. Generally, the optical element may impart at least one phase singularity within the laser pulse. Alternatively or additionally, the optical element may include at least one optical inhomogeneity.

17 Claims, 4 Drawing Sheets

U.S. PATENT DOCUMENTS 6,377,436 B1    4/2002    Margolin

OTHER PUBLICATIONS

Bazelyan and Raizer, "Spark Discharge," 1998 CRC Press LLC, New York (ISBN 0 8493 2868 3).
Bazelyan and Raizer, "Lightning Physics and Lightning Protection," Institute of Physics, London 2000 (ISBN 0 7503 0477 4).
David W. Koopman and T. D. Wjlkerson, "Channeling of an Ionizing Electrical Streamer by a Laser Beam," Journal of Applied Physics, vol. 42, No. 5, Apr. 1971.
Shindo et al., "Model Experiments of Laser-Triggered Lightning," IIIE Transactions on Power Delivery, vol. 8, No. 1, p. 311, Jan 1993.
Miki et al., "Development of long gap discharges I guided by a pulsed CO, laser," J. Phys. D: Appl. Phys. 26 (1993) 1244-1252.
Bondiou et al., "Theoretical modelling of the development of the positive spark in long gaps," J. Phys. D: Appl. Phys. 27 (1994) 1252-1266.
Braun et al., "Self-channeling of high-peak-power femtosecond laser pulses in air," Jan. 1, 1995 / vol. 20, No. 1 | Optics Letters.
Zhao et al., "Femtosecon Ultraviolet Laser Pulse Induced Lightning Discharge in Gases," IEEE Journal of Quantum Electronics, vol. 31, No. 3, Mar 1995.
H. Schillinger et al., "Electrical conductivity of long plasma channels in air generated by self-guided femtosecond laser pulses," Appl. Phys. B 68, 753-756 (1999).
Fontaine et al., "Filamentation of ultrashort pulse laser beams resulting from their propagation over long distances in air," Sphysics of Plasmas, vol. 6, No. 5, May 1999.
Bazelyan et al., "The mechanism of lightning attraction and the problem of lightning initiation by lasers," Physics—Uspekhi 43 (7) 701 -716 (2000).
S. Tzortzakis et al. "Femtosecond laser-guided electric discharge in air," Physical Review E, vol. 64, 057401, The American Physical Society 2001.
Schwarz et al., "Measurements of multiphoton ionization coefficients with ultrashort ultraviolet laser pulses," Appl. Phys. B 72, 343-347 (2001) / Digital Object Identifier (DOI) 10.1007/s003400100496.
Ladoucer et al, "Electrical conductivity of a femtosecond laser generated plasma channel in air," Optics Communications 189 (2001) pp. 107-111, Mar 2001.
Comtois et al., "Triggering and Guiding of an Upward Positive LeaderFrom a Ground Rod WIth an Ultrashort Laser Pulse—II: Modeling," IEEE Transactions on Plasma Science, vol. 31, No. 3, Jun. 2003.
Comtois et al., "Triggering and Guiding of an Upward Positive Leader From a Ground Rod With an Ultrashort Laser Pulse—I: Experimental Results," IEEE Transactions on Plasma Science, vol. 31, No. 3, Jun. 2003.
Vidal et al., "Modeling the triggering of Streamers in Air by Ultrashort Laser Pulses," IEEE Transactions on Plasma Science, vol. 28, No. 2, Apr. 2000.
Mercure et al., "Guiding and Triggering large-scale spark discharges Using Ultrashort Pulse Lasers," 25th Intenational Conference on Lighting Protection, Rhodes-Greece, Sep. 18-22, 2000, p. 48.
Vidal et al., "The control of lightning using lasers: properties of streamers and leaders in the presence of laser-produced ionization," C.R. Physique 3 (2002) 1361-1374.
Pepin et al., "Triggering and guiding high-voltage large-scale leader discharges with sub-joule ultrashort laser pulses," Physics of Plasmas, vol. 8, No. 5, May 2001.
Rambo et al., "High-voltage electrical discharges induced by an ultrashort-pulse UV laser system,"J. Opt. A: Pure Appl. Opt. 3 (2001) 146-158.
Rodriguez et al., "Triggering and guiding megavolt discharges by use oflaser-induced ionized filaments," Optics Letters / vol. 27, No. 9 / May 1, 2002.
Gordon et al., Streamerless guided electric discharges triggered by femtosecond filaments.
Penano, "Ultrashort Laser Pulse Propagation and Induced Discharges," NTAR Symposium Nov. 15-17, 2004, NRL.
Kozma, "A Brief Historyof Laser Guided Lightning Discharge Models and Experiments," Phillips Laboratory Technical Report PLTR-94-2193, Environmental Research Papers, No. 1153.

* cited by examiner

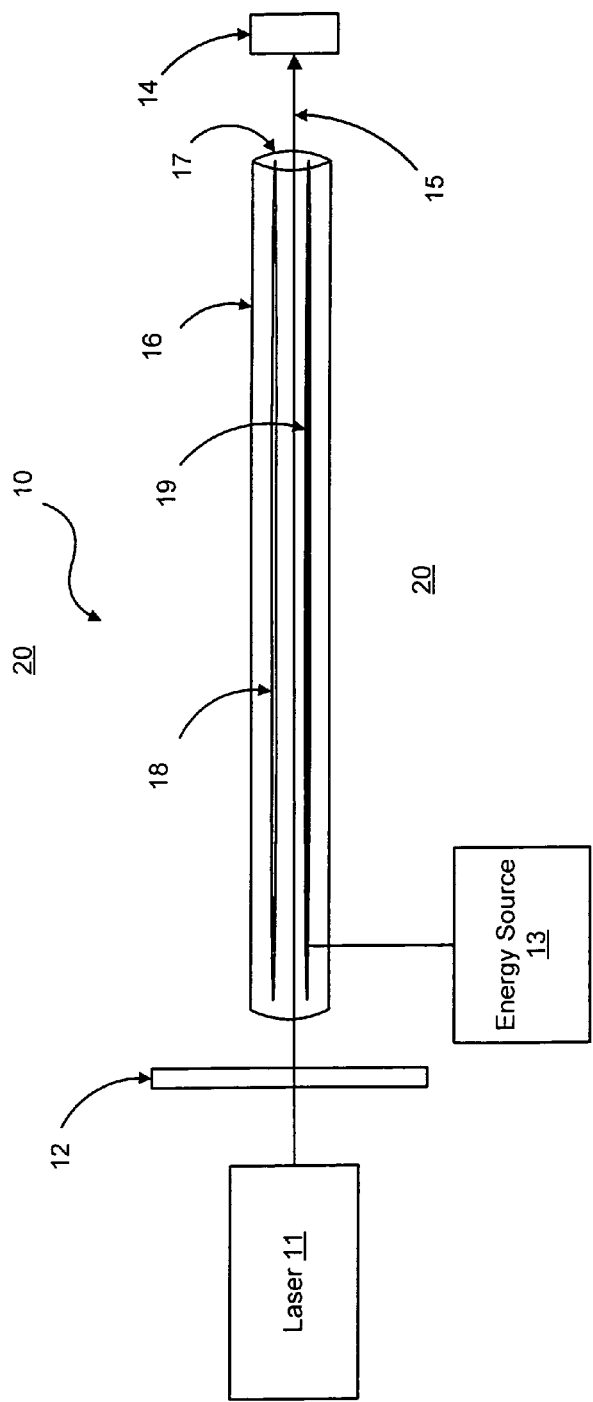
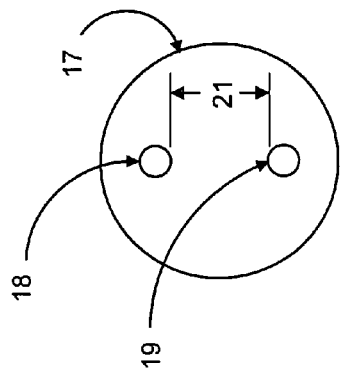
Figure 1
Figure 2

CONTROLLED OPTICAL FILAMENT GENERATION AND ENERGY PROPAGATION

CROSS-REFERENCE TO RELATED APPLICATIONS

This patent application is a continuation-in-part patent application from U.S. patent application Ser. No. 10/640,304 (filed Aug. 14, 2003 now U.S. Pat. No. 7,050,469 and entitled "Generation of Optical Filaments by Use of Localized Optical Inhomogeneities"; hereinafter the "'304 Application") and U.S. patent application Ser. No. 10/640,336 (filed Aug. 14, 2003 now U.S. Pat. No. 7,277,460 and entitled "Generation of Optical Filaments by Use of Phase Plate"; hereinafter the "'336 application"), the entire contents of each of which are incorporated herein by reference.

TECHNICAL FIELD

Systems and methods presented herein generally relate to controlled generation of optical filaments. More specifically, the systems and methods provide a propagation path for energy, such as electrical energy, optical energy, and/or electromagnetic energy, by way of the generated optical filaments.

BACKGROUND

Generally, an optical filament is a substantially non-diffracting extremely intense optical feature within an optical beam that can propagate over relatively long distances through a medium. For example, when a beam of relatively high intensity light passes through a gas, the gas reacts and the beam of light begins to self-focus. The beam may focus such that the optical intensity increases significantly and the gas thereby ionizes to form plasma. The resulting plasma tends to defocus the beam. By balancing self-focusing with the defocusing effects of the plasma, one can generate an optical filament that propagates over greater distances.

Optical filaments have applications that may include laser controlled energy discharges, long-range deposition of high laser intensities, and Light Detecting and Ranging (LIDAR). The precise formation of optical filaments, however, is generally uncontrolled. That is, while an optical filament may be generated within a beam cross-section of a laser pulse, the placement of that optical filament within the beam cross-section is generally arbitrary. Optical filaments may generate significant plasma densities having lifetimes that far exceed the optical filament pulse lengths (i.e., durations). The plasma that is left in the wake of an optical filament is generally referred to herein as a plasma filament.

SUMMARY

Systems and methods presented herein provide for the controlled formation of one or more optical filaments. In one embodiment, a method of controlling energy radiation through a gas includes generating a laser pulse and propagating the laser pulse with an optical element to control placement of an optical filament within a beam cross-section of the laser pulse. The method may further include propagating energy along the beam path of an optical filament for use in an energy application. For example, the optical filament may be used to generate a plasma filament. Plasma filaments may, in turn, be used as seeded channels for guiding or seeding the propagation of energy channels. Such energy may include electrical energy, electromagnetic energy, or a combination the'reof.

Generating the laser pulse may include generating the laser pulse in the infrared spectrum. Propagating the energy may include ionizing the gas along the optical filament. For example, propagating the laser pulse may include directing the laser pulse proximate to an electrode. Additionally, propagating the energy may include discharging electrical energy from the electrode.

Propagating the laser pulse may include propagating the laser pulse with an optical element to control placement of at least two optical filaments within the beam cross-section of the laser pulse. In this regard, propagating the laser pulse may further include controlling placement of the optical filaments within the beam cross-section of the laser pulse to generate a corresponding at least two plasma filaments. These plasma filaments, acting as a "seeded channel", may be used to propagate the energy when the energy is delivered thereto. When energy is delivered to a seeded channel, the energy may grow throughout the seeded channel and thereby transform it into an energy channel which may be used to wirelessly transfer the energy from one point to another.

A distance between the resulting plasma filaments may suppress energy discharge from a filament guided energy channel and a plasma filament. For example, when the energy is delivered to a seeded channel and the energy grows throughout the channel, energy may discharge from the seeded channel to a plasma filament generated by another optical filament. This energy discharge may drain the energy from the seeded channel and weaken the overall energy transfer. By controllably placing the optical filaments within a beam cross-section, plasma filaments and thus seeded channels may be spaced at a distance that decreases the likelihood for energy discharging from one seeded channel to another (i.e., voltage requirements for discharge increase as distance between seeded channels increases).

In another embodiment, a system radiates energy through a gas and includes a laser that generates a laser pulse and an optical element with which the laser propagates the laser pulse to control placement of an optical filament within a beam cross-section of the laser pulse. The system may also include an'energy source that provides energy, wherein a resulting plasma filament guides propagation of the energy for delivery to an application. The energy may be electrical energy, electromagnetic energy, optical energy, or a combination thereof.

Generally, the laser pulse may be in the infrared range. However, those skilled in the art should readily recognize that other wavelengths of light may be used, such as those in the ultraviolet and visible light ranges. In one embodiment, a laser was used to generate the laser pulse at a wavelength of about 400 nanometers. The optical element may impart at least one phase singularity within the laser pulse. Alternatively or additionally, the optical element may include at least one optical inhomogeneity. The optical element may control placement of at least two optical filaments within the beam cross-section of the laser pulse, wherein a distance between the at least two optical filaments suppresses energy discharge from a resulting energy channel to a resulting plasma filament. The optical element may be transmissive and/or mirrored.

In another embodiment, a system controls placement of an optical filament and includes a laser that fires a laser pulse and an optical element disposed in a path of the laser pulse, wherein the optical element changes the configuration of the pulse to control generation and placement of at least one optical filament. The optical filament generates a plasma filament, which in turn acts as a seeded channel. The seeded channel may be used to guide the propagation of an energy channel. The system further includes an energy source that provides energy to the seeded channel to generate an ionized energy channel that propagates the energy.

BRIEF DESCRIPTION OF THE DRAWINGS

FIG. 1 is a block diagram of a system that controls placement of plasma filaments.

FIG. 2 illustrates a beam cross-section of a laser beam path produced by a laser pulse.

DETAILED DESCRIPTION OF THE DRAWINGS

Figure 3:
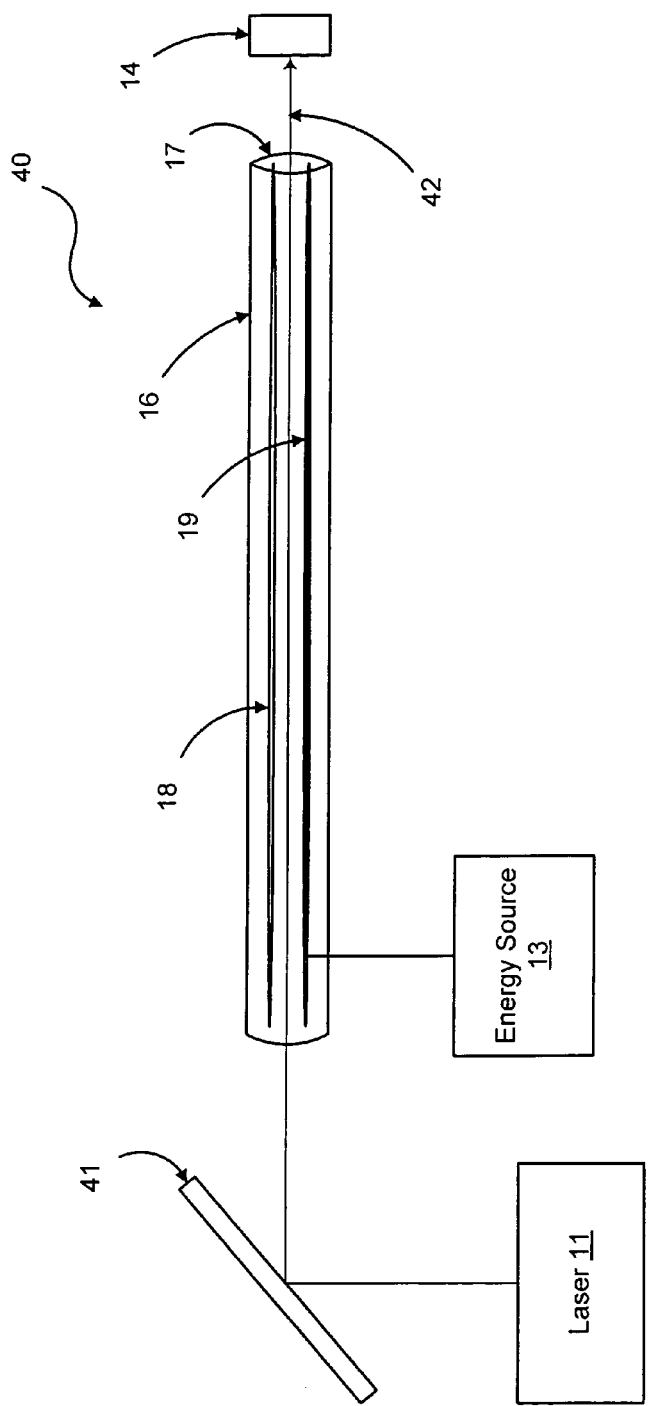
FIG. 3 is a block diagram of another system that controls placement of plasma filaments.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

FIG. 1 is a block diagram of system 10 that controls placement of plasma filaments, such as plasma filaments 18 and 19 within laser beam 16. In this regard, system 10 includes laser 11 that generates laser pulse 14 for propagation through gaseous medium 20. Generally, laser pulse 14 has an optical intensity, pulse duration, and/or wavelength capable of ionizing gaseous medium 20 along path 15 of which laser pulse 14 propagates. For example, laser 11 may generate laser pulses in the infrared spectrum (e.g., roughly in the 700 nanometer to 1400 nanometer range) having pulse durations between 50 femtoseconds (fs) and 100 picoseconds (ps). The optical intensity of such laser pulses may be 10 millijoules (mJ) or greater.

System 10 also includes transmissive optical element 12 to assist in the formation of plasma filaments 18 and 19. For example, in this embodiment, optical element 12 may include focusing aspects that concentrate the optical intensity at various places within beam cross-section 17 of laser beam 16. The concentrated optical intensities may thereby generate optical filaments, which result in plasma filaments 18 and 19 within beam cross-section 17. Such focusing aspects may include optical inhomogeneities that cause phase changes in laser pulse 14 as a laser pulse propagates through optical element 12. Alternatively or additionally, these focusing aspects may include features that impart one or more phase singularities onto laser pulse 14. Optical inhomogeneities and phase singularities are described in the '336 and '334 applications.

Optical element 12 may be configured to perform as mentioned via "etching" of the optical element. For example, a "phase mask" may be etched onto optical element 12 so as to create a phase singularity or discontinuity with laser pulse 14. Other configurations may include shape alterations of optical element 12 at various locations upon the optical element. Such alterations may create differences in refraction that alter the phase of laser pulse 14.

The focusing aspects of optical element 12 may be configured with the optical element so as to control placement of plasma filaments 18 and 19. For example, optical element 12 may be a physical lens (e.g., glass, plastic, etc.) that has phase altering characteristics at certain locations on the lens. These positioned characteristics may cause plasma filaments to form proximate thereto. An example of such is shown in FIG. 2 where plasma filaments 18 and 19 are separated by distance 21 within cross-section 17 of laser beam 16.

Alternatively or additionally, optical element 12 may include a plurality of lenses, each with one or more focusing aspects that form plasma filaments 18 and 19. In this regard, the lenses may then be controllably positioned for independent formation of plasma filaments 18 and 19. For example, one lens may form optical filament 18 at one position with cross section 17 of laser beam 16 while a second lens forms plasma filament 19 at a second position within cross-section 17 of laser beam 16.

In one embodiment, system 10 is capable of positioning plasma filaments 18 and 19 within beam cross-section 17 of laser beam 16 in such a way that substantially prevents energy discharges from one plasma filament (e.g., plasma filament 19) to another plasma filament (e.g., plasma filament 18) within the cross-section. For example, plasma filaments, generally, provide a sort of pre-ionization of gaseous medium 20 along a tightly confined path. This pre-ionized path may be used to discharge energy thereto and guide that energy along the plasma filament. In this regard, system 10 may include energy source 13 for delivering energy to plasma filament 19. Plasma filament 19 may therefore function as a seeded channel which guides delivered energy in the direction of path 15 along which laser pulse 14 travels.

Energy source 13 may be configured in a variety of ways. For example, energy source 13 may be an electrical power supply capable of providing electrical energy. In such an embodiment, energy source 13 may include an electrode that is used to discharge the electrical energy to a plasma filament within laser beam 16 (e.g., plasma filament 19) to direct the electrical energy along path 15 of laser pulse 14. In one embodiment, energy source 13 is a high voltage electrical energy source capable of delivering electrical energy having voltages within a range of 50 kilovolts (kV) to 2.5 megavolts (MV). Those skilled in the art, however, should readily recognize that the invention is not intended to be limited to sources having voltages in this range or even to electrical energy sources. Rather, other forms of energy may be delivered to plasma filaments. Examples of such energy may include optical energy, such as additional laser energy, and/or other forms of electromagnetic energy, such as radiofrequency energy.

Directing energy via plasma filaments (e.g., electrical energy, nonoptical electromagnetic energy, and/or optical energy) may have certain advantages. For example, the propagation of energy via plasma filaments from one point to another point may allow for the energy to be used by an application at some distance from energy source 13 without the use of cables, wires, etc. Other examples include the use of directing communications along a direct line of sight, which may prevent intrusions into or interceptions of the communications.

FIG. 3 is a block diagram of system 40 that controls placement of plasma filaments 18 and 19 within cross-section 17 of laser beam 16. For example, system 40 is similar to system 10 in that system 40 controllably provides plasma filaments (e.g., plasma filaments 18 and 19) within a laser beam (e.g., laser beam 17). Differing from system 10 is optical element 41. In this embodiment, optical element 41 is more of a reflective surface, such as a mirror, that reflects laser pulse 14 (i.e., fired from laser 11) along path 42.

As with system 10, laser 11 fires laser pulse 14 with a certain optical intensity, pulse duration, and/or wavelength that is capable of ionizing gaseous medium 20 along path 42 of which laser pulse 14 propagates. Laser pulse 14 may impinge optical element 41 and reflect along path 42 to generate plasma filaments within laser beam 16. In this regard, optical element 41 may include one or more optical inhomogeneities that alter the phase or amplitude of laser pulse 14 to assist in the generation of plasma filaments 18 and 19. Alternatively or additionally, optical element 41 may impart phase singularities and/or discontinuities upon laser pulse 14.

As described above with regard to optical element 12, optical element 41 may be configured to perform as mentioned (i.e., to impart phase changes and/or phase singularity onto laser pulse 14) via "etching" of the optical element and via shape irregularities of the optical element. For example, a "phase mask" may be etched onto optical element 12 so as to create phase singularities and/or discontinuities with laser pulse 14. Other configurations may include shape alterations of optical element 41 at various locations upon the optical element. Such alterations may create differences in refraction that alter the phase of laser pulse 14.

Like optical element 12, optical element 41 may also be configured of multiple components. For example, optical element 41 may be configured as a combination of mirrors and lenses that alter the phase of laser pulse 14 so as to create plasma filaments 18 and 19 at different locations within cross-section 17 of laser beam 16. That is, plasma filaments 18 and 19 may be separated by a distance, such as distance 21 of FIG. 2 described hereinabove. This distance, again, may assist in preventing energy discharge from one plasma filament (e.g., plasma filament 19) to another plasma filament (e.g., plasma filament 18). Such discharges are shown and described in greater detail below in FIGS. 4 and 5.

Although optical element 41 is described with respect to mirrored surfaces, the invention is not intended to be limited to mirrors. Rather, optical element 41 may, in some cases, be configured to absorb some optical intensity of laser pulse 14 and/or be configured to pass portions of the optical intensity (e.g., be partially transmissive).

Figure 4:
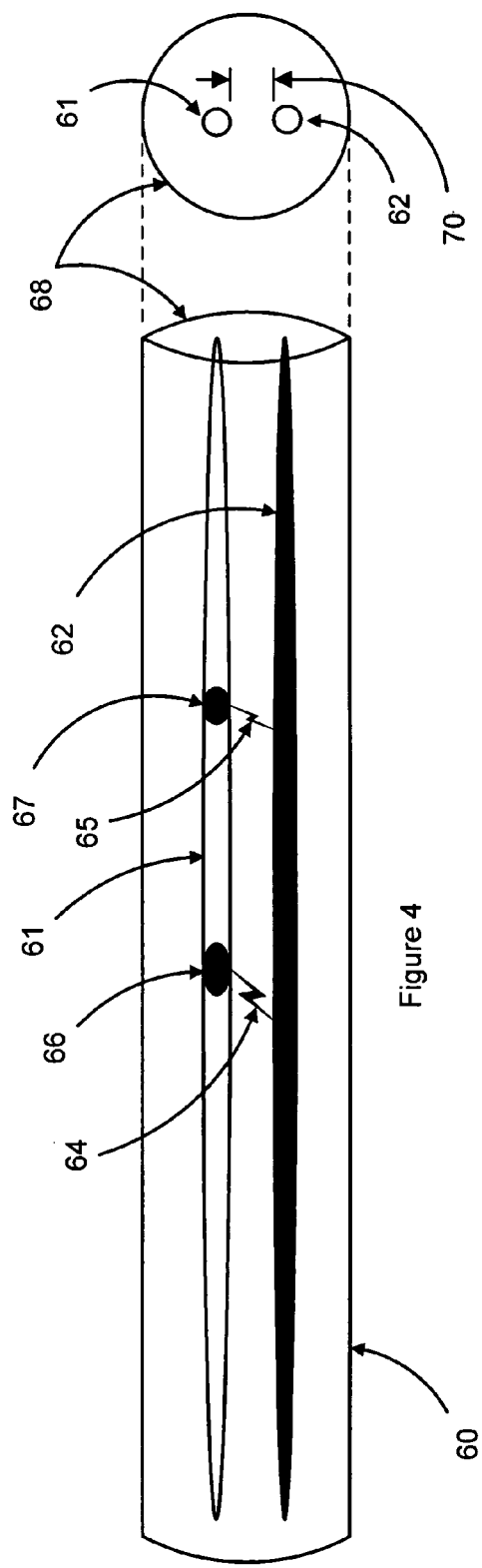
FIG. 4 illustrates a laser beam that generates plasma filaments.
Figure 5:
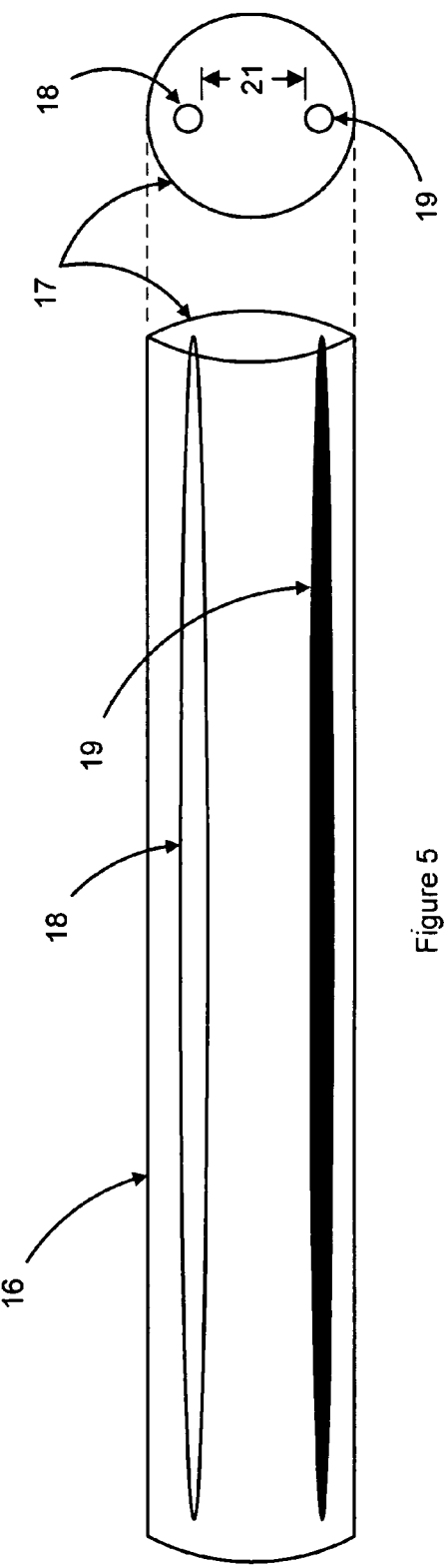
FIG. 5 illustrates another laser beam that generates plasma filaments.

FIGS. 4 and 5 each illustrate a laser beam (i.e., laser beams 60 and 16, respectively) that includes plasma filaments. One difference between FIGS. 4 and 5 regards the separation between plasma filaments. For example, laser beam 60 includes plasma filaments 61 and 62 separated by a distance 70 within cross-section 68 of laser beam 16, whereas laser beam 16 includes plasma filaments 18 and 19 separated by a relatively larger distance 21 within cross-section 17.

Although systems 10 and 40 described hereinabove may be configurable to generate plasma filaments such as are illustrated in either laser beam 60 or laser beam 16, the distance 21 between plasma filaments 18 and 19 of laser beam 16 assists in preventing an energy discharge from one plasma filament (e.g., plasma filament 19) to another plasma filament (e.g., plasma filament 18). For example, as an energy source, such as energy source 13 described hereinabove, discharges energy to plasma filament 19, the energy tends to propagate along that plasma filament. The distance 71 between plasma filaments 18 and 19 may deter discharge from plasma filament 19 to plasma filament 18 because, among other reasons, a greater voltage of electrical energy may be necessary to overcome distance 71 and form a dielectric breakdown between the two plasma filaments.

FIG. 4 illustrates discharge breakdowns 64 and 65 which cause energy from plasma filament 62 to discharge towards plasma filament 61. These energy discharges towards plasma filament 61 cause energy to grow outward from plasma filament 62 (see e.g., energy growths 66 and 67), thereby draining the energy along the path of plasma filament 62. These energy drains along one plasma filament may cause the energy to dissipate altogether before useful application thereof. For example, the energy propagated along plasma filament 19 may be applied in a manner described hereinabove. Dissipation of that energy before it reaches a target may substantially reduce the effectiveness in the application of that energy.

In another embodiment, however, multiple plasma filaments may be grouped in very close proximity such that they may collectively guide energy. Generally, plasma filaments that are outside of such a small region containing one or filaments provide few advantages. In this regard, if a pulse has so much energy that additional filaments are likely to occur outside the small region, it may be useful to cause their formation as far away from the region has possible.

Although shown and described with respect to controllably separating the distance between plasma filaments such that energy along one plasma filament does not discharge towards another plasma filament, the invention is not intended to be limited to such energy applications. Those skilled in the art should readily recognize that plasma filament control may have applications outside the realm of energy propagation. As such, other embodiments may advantageously exist where control of optical filament formation provides for plasma filaments in close proximity to one another.

Figure 6:
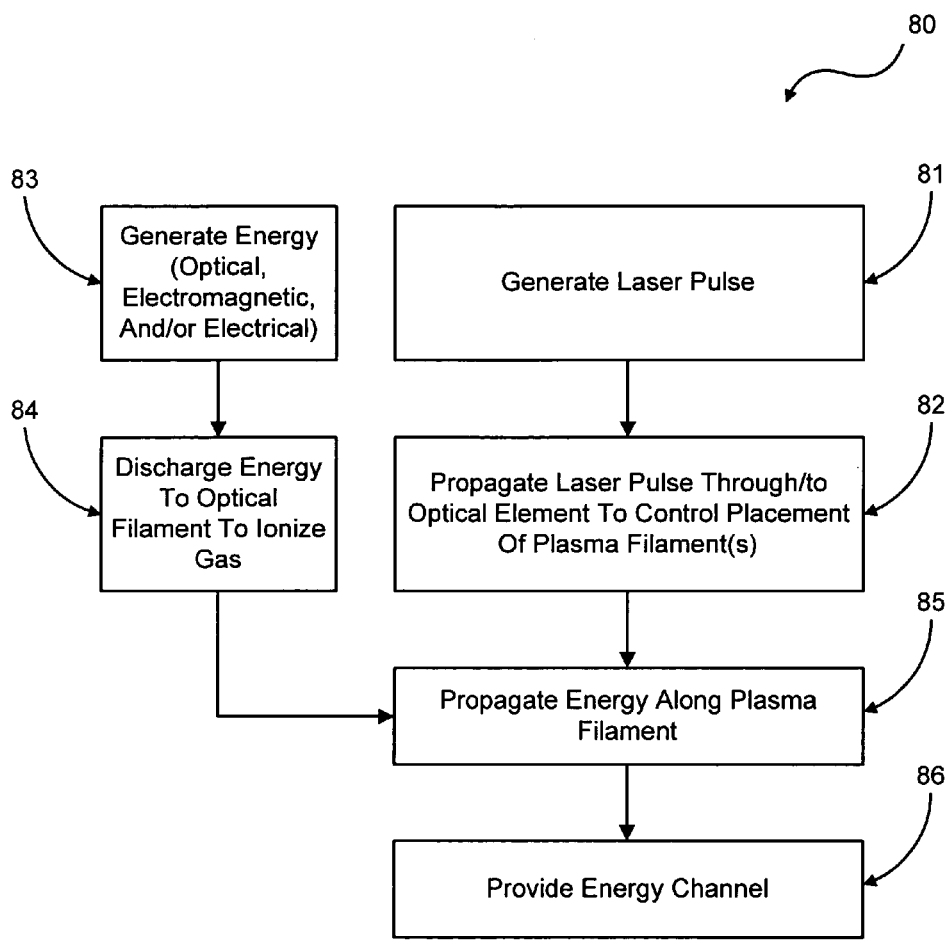
FIG. 6 is a flowchart of a process that controls placement of plasma filaments and discharges energy thereto.

FIG. 6 is a flowchart of process 80 that controls placement of plasma filaments, such as plasma filaments 18 and 19 described hereinabove. In this embodiment, a laser pulse is generated by a laser, such as laser 11 described hereinabove, in process element 81. For example, the laser may configure a laser pulse to have a certain pulse width, optical intensity, and/or wavelength that is suitable to ionize a gaseous medium, such as air.

The laser may then propagate the laser pulse towards an optical element, such as optical elements 12 or 41 described hereinabove, in process element 82. For example, the optical element may include transmissive and/or reflective components that alter a phase of the laser pulse impinging thereon. Such phase alterations may include imparting phase singularities upon the laser pulse, as described hereinabove. In this regard, the optical element may assist in the formation of plasma filaments proximate thereto. Control of the optical element and/or its configuration may allow for the spaced formation of the plasma filaments so as to prevent energy discharge from one plasma filament to another.

With the plasma filaments generated, energy may be propagated along the plasma filament, in process element 85. In this regard, an energy source, such as energy source 13 described hereinabove, may generate energy, in process element 83. For example, the energy source may provide electrical, optical, and/or electromagnetic energy for propagation along the plasma filament. This energy may be discharged to the plasma filament to ionize a gas through which the plasma filament propagates, in process element 84. Upon discharging the energy to the plasma filament, the energy may propagate along the plasma filament (i.e., process element 85). In doing so, the propagating energy may provide an energy channel (i.e., process element 86) for delivery and application of the energy at a point distal to the generation thereof. For example, the energy may be deposited with a target at some distance from where the energy is generated.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method of controlling energy radiation through a gas, including: generating a laser pulse; propagating the laser pulse with a transmissive optical element to control placement of at least two plasma filaments within a beam cross-section of the laser pulse; and propagating energy from an external source along the plasma filaments for use in an energy application, wherein a distance between said at least two plasma filaments temporarily suppresses energy discharge between said at least two plasma filaments.

2. The method of claim 1, wherein said energy includes electrical energy, optical energy, electromagnetic energy, or a combination thereof.

3. The method of claim 1, wherein generating said laser pulse includes generating the laser pulse in the infrared spectrum.

4. The method of claim 1, wherein propagating said energy includes ionizing the gas along the plasma filaments.

5. The method of claim 1, wherein propagating said laser pulse includes directing the laser pulse proximate to an electrode.

6. The method of claim 5, wherein propagating said energy includes discharging electrical energy from the electrode.

7. The method of claim 1, wherein the optical element imparts at least one phase singularity within the laser pulse.

8. The method of claim 1, wherein the optical element includes at least one optical inhomogeneity.

9. A system that radiates energy through a gas, including: a laser that generates a laser pulse;
a transmissive optical element through which the laser propagates the laser pulse to control placement of at least two plasma filaments within a beam cross-section of the laser pulse; and an energy source external to the laser that provides energy, wherein the plasma filaments directs propagation of the energy for delivery to an application, wherein a distance between said at least two plasma filaments temporarily suppresses energy discharge between said at least two plasma filaments.

10. The system of claim 9, wherein the energy is electrical energy, electromagnetic energy, optical energy, or a combination thereof.

11. The system of claim 9, wherein the laser pulse is in the infrared range.

12. The system of claim 9, wherein the optical element imparts at least one phase singularity within the laser pulse.

13. The system of claim 9, wherein the optical element includes at least one optical inhomogeneity.

14. A system that controls placement of an plasma filament, comprising
a laser that fires a laser pulse; a transmissive optical element disposed in a path of the laser pulse, wherein the optical element changes the configuration of the pulse to control generation and placement of at least two plasma filaments; and an energy source external to the laser, wherein the energy source provides energy to the at least two plasma filaments to generate an ionized channel that propagates the energy, wherein a placement of a first plasma filament temporarily substantially prevents energy discharge from the first plasma filament to the second plasma filament.

15. The system of claim 14, wherein the energy is electrical energy, electromagnetic energy, optical energy, or a combination thereof.

16. The system of claim 14, wherein the optical element includes at least one optical inhomogeneity that imparts at least one phase singularity within the laser pulse.

17. A system that radiates energy through a gas, including: a laser that generates a laser pulse;
an optical element through which the laser propagates the laser pulse to control placement of at least two plasma filaments within a beam cross-section of the laser pulse, wherein the optical element imparts at least one phase singularity within the laser pulse; and an energy source external to the laser that provides energy, wherein the plasma filaments direct propagation of the energy for delivery to an application, wherein a distance between said at least two plasma filaments temporarily suppresses energy discharge between said at least two plasma filaments.

* * * * *